(12) United States Patent
Pineda et al.

(10) Patent No.: US 11,934,406 B2
(45) Date of Patent: Mar. 19, 2024

(54) DIGITAL CONTENT DATA GENERATION SYSTEMS AND METHODS

(71) Applicant: NBCUniversal Media, LLC, New York, NY (US)

(72) Inventors: Zeidee Pineda, West New York, NJ (US); Nicole Torres, Freehold, NJ (US); Bing Xu, Fort Lee, NJ (US); Nana Yaw Essuman, Dumfries, VA (US); Hengyu Tang, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 277 days.

(21) Appl. No.: 16/952,908

(22) Filed: Nov. 19, 2020

(65) Prior Publication Data

US 2022/0156265 A1 May 19, 2022

(51) Int. Cl.
*G06F 7/00* (2006.01)
*G06F 7/14* (2006.01)
*G06F 16/2455* (2019.01)
*G06N 20/00* (2019.01)

(52) U.S. Cl.
CPC .......... *G06F 16/24558* (2019.01); *G06F 7/14* (2013.01); *G06N 20/00* (2019.01)

(58) Field of Classification Search
CPC .......... G06F 16/90344; G06F 16/3346; G06F 16/74; G06F 16/24558; G06F 7/14; G06F 16/215; G06F 16/41; G06N 20/00
See application file for complete search history.

(56) References Cited

U.S. PATENT DOCUMENTS

| | | | | |
|---|---|---|---|---|
| 7,546,288 B2 * | 6/2009 | Springer, Jr. | ......... | G06F 16/907 707/999.005 |
| 10,318,543 B1 * | 6/2019 | Sharifi | ................ | G06F 40/134 |
| 10,534,783 B1 * | 1/2020 | Raczko | ............... | G06F 16/9035 |
| 11,361,094 B2 * | 6/2022 | Harb | ...................... | G06F 21/31 |
| 11,373,257 B1 * | 6/2022 | Guo | ...................... | G06F 16/288 |
| 2005/0055372 A1 * | 3/2005 | Springer, Jr. | ......... | G06F 16/907 707/E17.084 |
| 2007/0143370 A1 * | 6/2007 | Bushmitch | ............ | H04H 60/46 |

(Continued)

OTHER PUBLICATIONS

European Search Report for EP Application No. 21209391.8 dated Mar. 16, 2022, 9 Pages.

*Primary Examiner* — Mohammed R Uddin
(74) *Attorney, Agent, or Firm* — Fletcher Yoder, P.C.

(57) ABSTRACT

A system includes hardware processors and a non-transitory memory storing instructions that, when executed by the hardware processors, causes the hardware processors to perform actions including receiving an input data set related to digital content, where the input data set includes a plurality of input entries. The actions also include matching one or more input words of each input entry of the plurality of input entries to one or more baseline words of one or more baseline entries of a baseline data set and generating an output data set including a plurality of output entries. Each respective input entry corresponds to a respective output entry of the plurality of output entries, and each respective output entry includes a baseline entry of the one or more baseline entries having a highest probability of matching the respective input entry and additional data associated with the respective input entry.

18 Claims, 7 Drawing Sheets

(56) References Cited

U.S. PATENT DOCUMENTS

| | | | |
|---|---|---|---|
| 2007/0214130 A1 | 9/2007 | Miller | |
| 2009/0254543 A1* | 10/2009 | Ber | G06F 16/907 |
| | | | 707/999.005 |
| 2010/0223056 A1* | 9/2010 | Kadirkamanathan | G10L 13/08 |
| | | | 704/E15.005 |
| 2012/0041955 A1* | 2/2012 | Regev | G06F 16/355 |
| | | | 707/E17.089 |
| 2012/0131139 A1* | 5/2012 | Siripurapu | H04L 65/60 |
| | | | 709/217 |
| 2012/0291072 A1* | 11/2012 | Maddison | H04N 21/4782 |
| | | | 725/53 |
| 2012/0317085 A1* | 12/2012 | Green | G06F 16/437 |
| | | | 707/E17.058 |
| 2013/0343598 A1* | 12/2013 | Kocks | H04N 21/251 |
| | | | 382/218 |
| 2015/0199351 A1* | 7/2015 | Borenstein | G06F 16/43 |
| | | | 707/740 |
| 2016/0012445 A1* | 1/2016 | Villa-Real | G06Q 20/40145 |
| | | | 705/44 |
| 2016/0313868 A1* | 10/2016 | Weng | G06F 3/04883 |
| 2016/0378862 A1* | 12/2016 | Ong | H04N 21/4782 |
| | | | 707/769 |
| 2019/0340656 A1* | 11/2019 | Orlandic | G06F 3/04817 |
| 2020/0159773 A1* | 5/2020 | Chao | G06F 16/90332 |
| 2020/0204861 A1* | 6/2020 | Loheide | H04N 21/8456 |
| 2021/0374188 A1* | 12/2021 | Miller | G06N 20/00 |
| 2022/0156265 A1* | 5/2022 | Pineda | G06F 16/24558 |
| 2022/0188877 A1* | 6/2022 | Fokins | G06Q 30/0277 |

* cited by examiner

DIGITAL CONTENT DATA GENERATION SYSTEMS AND METHODS

BACKGROUND

The disclosure relates generally to digital content data generation systems and methods.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Digital content, such as movies, television series, still images, and music, may be provided via multiple, different platforms and may be stored in multiple, corresponding databases. For example, an on-demand streaming platform may stream digital content and may store representations of the digital content in a database. A broadcast network may also stream digital content and may store representations of the digital content in a database. Additionally, third-party services may track and store additional data related to such digital content in a database. Each such database may be separate and different. Further, although some digital content may be common or the same across some of the databases, the digital content may be named differently in each database. As such, combining data for the same digital content across the databases may be a difficult, time-consuming process.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer-readable medium includes computer readable instructions, that when executed by one or more processors, causes the one or more processors to perform operations including receiving an input data set related to digital content, where the input data set includes a plurality of input entries. The operations include matching each input entry of the plurality of input entries to one or more baseline entries of a baseline data set and assigning a probability score to each respective baseline entry for each respective input entry based on metadata associated with the input data set. The probability score for each respective baseline entry indicates a probability that the respective baseline entry is an accurate match to the input entry. Further, the operations include generating an output data set including a plurality of output entries, where each respective input entry corresponds to a respective output entry of the plurality of output entries. Each respective output entry includes a baseline entry of the one or more baseline entries having a highest probability score and additional data associated with the respective input entry.

In an embodiment, a system includes one or more hardware processors and a non-transitory memory storing instructions that, when executed by the one or more hardware processors, causes the one or more hardware processors to perform actions including receiving an input data set related to digital content, where the input data set includes a plurality of input entries. The actions also include matching one or more input words of each input entry of the plurality of input entries to one or more baseline words of one or more baseline entries of a baseline data set and generating an output data set including a plurality of output entries. Each respective input entry corresponds to a respective output entry of the plurality of output entries, and each respective output entry includes a baseline entry of the one or more baseline entries having a highest probability of matching the respective input entry and additional data associated with the respective input entry.

In an embodiment, a method of generating data related to digital content includes receiving an input data set related to digital content, where the input data set includes a plurality of input entries. The method includes matching one or more input words of each input entry of the plurality of input entries to one or more baseline words of one or more baseline entries of a baseline data set and generating an output data set including a plurality of output entries. Each respective input entry corresponds to a respective output entry of the plurality of output entries, and each respective output entry includes a baseline entry of the one or more baseline entries and additional data associated with the respective input entry.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
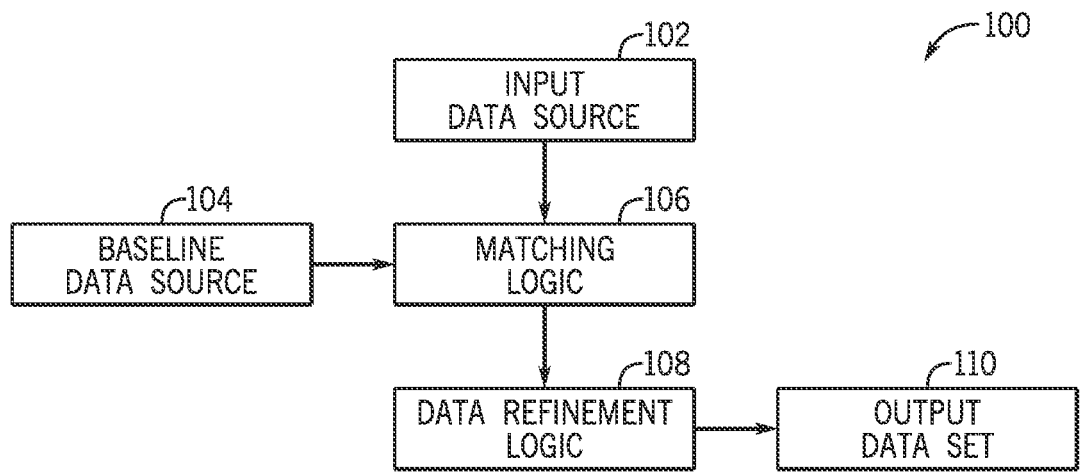
FIG. 1 is a schematic view of an embodiment of a system including an input data source, a baseline data source, and matching and data refinement logic that generate an output data set based on an input data set received from the input data source and a baseline data set received from the baseline data source, in accordance with one or more current embodiments.

Turning now to the drawings, FIG. 1 is a schematic view of a system 100 including an input data source 102, a baseline data source 104, matching logic 106, data refinement logic 108, and an output data set 110. As described herein, the system 100 may be configured to generate data (e.g., the output data set 110) related to digital content, people, or entities. For example, digital content may include movies, television series and programs, news segments, sports programs, still images (e.g., a frame of a video, a photograph), music, electronic books (eBooks), audiobooks, and other suitable forms of digital content. In particular, the matching logic 106 and the data refinement logic 108 may correlate digital content data received from the input data source 102 and the baseline data source 104 to produce the output data set 110. As described herein, the output data set 110 may be a more robust/complete data set relative to data provided by the input data source 102 and the baseline data source 104. Additionally, the output data set 110 may be used to gather/identify information related to the digital content and to make determinations regarding the digital content. The output data set 110 may also be used to gather/identify information related to people (e.g., athletes or celebrities) and entities such as companies or other organizations.

The input data source 102 may provide an input data set to the matching logic 106. In certain embodiments, the input data source 102 may be a database that stores the input data set. In some embodiments, the input data source 102 may be a content provider having the database that stores the input data set. The input data set may include input entries that generally correspond to the digital content. By way of example, the input data source 102 may be an on-demand streaming platform that provides movies, television series, and other digital content online via a streaming application. Input entries of the input data set may include titles of the movies and/or other digital content. Such titles, or input entries generally, may be particular to the input data source 102, such that the movies may be named differently by other entities and/or in other databases. The input entries of the input data set may include movie titles, series titles, episode titles, program titles, event titles, talent names, and/or advertisement information. In certain embodiments, the input data set may include data source information, genre information, a year of release, a year of production, viewership data, impression data, statistical information associated with actors/actresses, statistical information associated with athletes, and/or statistical information associated with entities.

For example, the baseline data source 104 may identify the same movie with a different title (relative to the input data source 102). A baseline data set provided by the baseline data source 104 may include baseline entries corresponding to titles of the same movies provided by the input data source 102 and/or other digital content provided by the input data source 102 (e.g., television series and programs, news segments, sports programs, still images (e.g., a frame of a video, a photograph), music, electronic books (eBooks), audiobooks, and other suitable forms of digital content). The baseline data source 104 may be a database that stores the baseline data set. In some embodiments, the baseline data source 104 may be a content provider (e.g., a content provider different from the input data source 102) or may be an entity that tracks, verifies, and/or stores information related to the digital content.

Some titles provided by the input data source 102 and/or the baseline data source 104 may have words omitted or abbreviated, may be in different languages, may include spelling variations, or may otherwise be spelled and/or phrased differently. Accordingly, the baseline data set provided by the baseline data source 104 may be considered a source of truth (e.g., a baseline) for comparison to the input data set provided by the input data source 102. For example, as described herein, the system 100 may compare each input entry provided by the input data source 102 to the baseline entries provided by the baseline data source 104 to determine a most likely match of a particular baseline entry or a list of likely baseline entries to each input entry.

The matching logic 106 and the data refinement logic 108 may perform steps to determine the match of the particular baseline entry or the list of likely baseline entries to each input entry. For example, the matching logic 106 may use natural language processing and/or other language matching algorithms and techniques to perform the matching. An output of the matching logic 106 may be the particular baseline entry and/or the list of likely baseline entries for each input entry. In particular, the matching logic 106 may generate an intermediate data set (e.g., an intermediate output) including the particular baseline entry and/or the list of likely baseline entries for each input entry.

The output (e.g., the intermediate output) of the matching logic 106 may be an input (e.g., an intermediate input) to the data refinement logic 108. For each input entry having a list of likely baseline entries, the data refinement logic 108 may further refine the list of likely baseline entries to determine a most likely baseline entry for the respective input entry. For example, if the intermediate data set provided by the matching logic 106 includes a list of three likely baseline entries for a given input entry, the data refinement logic 108 may review/process additional metadata associated with the digital content (e.g., the input data set and/or the baseline data set) to determine the most likely baseline entry of the three baseline entries that matches the input entry. Such metadata associated with the digital content may include genre information, a year of release, a year of production, viewership data, impression data, and other suitable metadata. In some embodiments, the metadata may include airing information, such as a channel (e.g., a television channel, a channel showing television shows and movies corresponding to a particular genre), a timeframe (e.g., a time of day and/or night at which the digital content is provided), and/or a frequency at which the digital content is provided via the channel.

After determining a matching baseline entry of the baseline data set for each respective input entry, the system 100 may generate the output data set 110 that includes output entries. Each output entry may include the matching baseline entry and additional data associated with the respective input entry. For example, the matching baseline entry and the respective input entry may identify the same movie, the same item of digital content, the same person, or the same entity. The respective input entry may include additional data that is not included in the matching baseline entry. Accordingly, such additional data may be associated with the baseline entry to generate a more robust and complete data set (e.g., the output data set 110) for use in analyzing, for example, the digital content.

Continuing with the example described above, the input data set provided by the input data source 102 may include hundreds or thousands of movies, such that each input entry of the input data set includes a single movie title in a text format specific to the input data source 102. In other examples, the input data set may include more or fewer movies and/or other items of digital content. The movie title of each input entry may be matched to a movie title in a particular baseline entry of the baseline data set provided by the baseline data source 104 (e.g., via the matching logic 106 and the data refinement logic 108). Metadata, such as viewership data, talent names, and/or other data, associated with each input entry may be associated with the particular baseline entry in the respective output entry of the output data set 110. The output data set 110 may then be used to analyze, research, view, and/or track information about the movie identified in each output entry of the output data set 110.

In certain embodiments, the baseline data set may be used to identify input entries in multiple, different input data sets to combine the multiple, different data sets into a single output data set accessible by a user. In some embodiments, when the user receives a new input data set, the user may import the new input data set into the system 100. The matching logic 106 and the data refinement logic 108 may perform the steps described herein to determine a matching baseline entry for each input entry of the new input data set to generate a new output data set or add to an existing output data set. For example, the existing output data set may not include some items of digital content from the new input data set. As such, the system 100 may facilitate building the output data set and may enhance the user's ability to analyze the corresponding digital content. In some embodiments, the system 100 may present the matching baseline entry to the user to enable the user to confirm that matching baseline entry for each input entry is correct. In certain embodiments, the system 100 may enable the user to identify a more appropriate matching baseline entry relative to a suggested baseline entry and/or to select a matching baseline entry from a list of suggested baseline entries.

Figure 2:
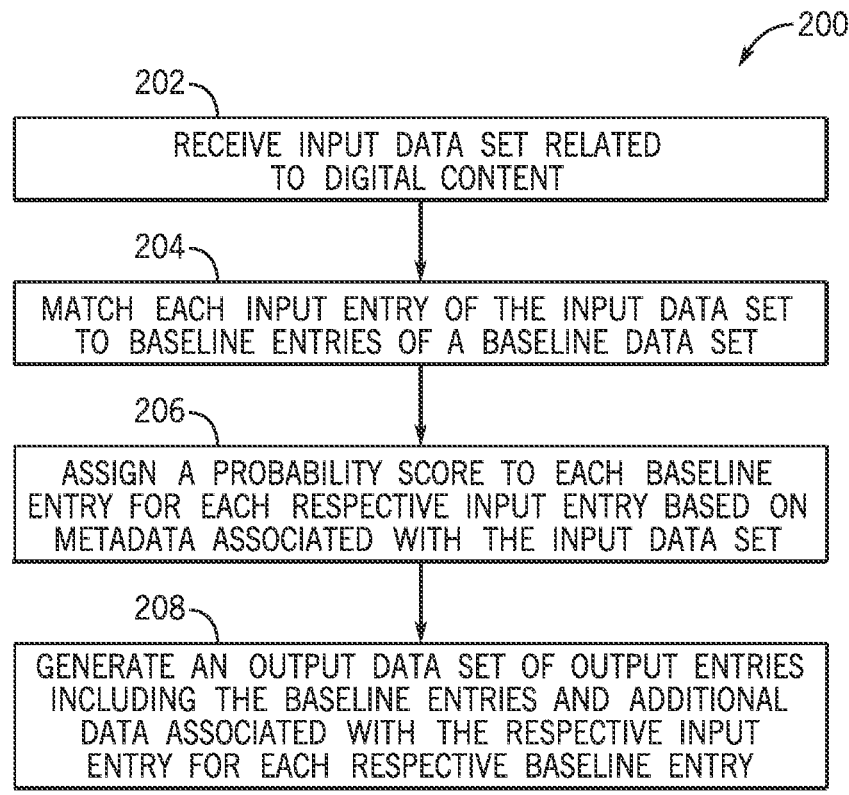
FIG. 2 is a flow diagram depicting an embodiment of a method that may be performed by the system of FIG. 1, in accordance with one or more current embodiments.

With the preceding in mind, FIG. 2 is a flow diagram depicting a method 200 that may be performed by the system 100 of FIG. 1. While the method 200 is described using steps in a specific sequence, it should be understood that the present disclosure contemplates that the described steps may be performed in different sequences than the sequence illustrated, and certain described steps may be skipped or not performed altogether. In some embodiments, the method 200 may be implemented by executing instructions stored in a tangible, non-transitory, computer-readable medium, such as a memory device (e.g., one or more memory devices), using a processor (e.g., one or more processors). For example, the one or more memory devices may store instructions for executing the matching logic 106 and/or the data refinement logic 108, and the one or more processors may execute such instructions.

As illustrated, in block 202, the processor may receive an input data set related to digital content, such as the input data set received from the input data source 102. As described above, the input data set may include input entries with each input entry identifying a unique item of digital content and including additional data associated with the unique item. For example, the input entry may include the name of a movie, a show, or a song, and may include additional data related to the media, such as artist name(s), year of release, media length, genre, other artist information, and other suitable data.

In block 204, the processor may match each input entry to one or more baseline entries, such as baseline entries of the baseline data set provided by the baseline data source 104. The matching may be performed by the matching logic 106, which may include natural language processing and/or other suitable matching techniques as described in greater detail in reference to FIG. 3. Accordingly, the matching logic 106 may generate the intermediate data set including the one or more baseline entries for each respective input entry.

In block 206, the processor assigns a probability score to each baseline entry for each respective input entry based on metadata associated with the input data set. In particular, for input entries having multiple baseline entries, the probability score may indicate a probability that the respective baseline entry is an accurate match to the respective input entry or vice versa. As such, in certain embodiments, block 206 may be omitted in instances where only one baseline entry is matched to a respective input entry in the intermediate data set (e.g., at block 204). In other embodiments, the processor may assign the probability score to the single baseline entry matched to the respective input entry. In some embodiments, the intermediate data set may include some input entries matched to multiple baseline entries and other input entries matched to a single baseline entries. The processor may perform the step of block 206 for input entries having multiple matched baseline entries, while the step of block 206 is omitted for input entries matched to a single respective baseline entry. The step of block 206 is described in greater detail in reference to FIG. 4.

In block 208, the processor generates an output data set of output entries, where each output entry includes a baseline entry matching a respective input entry and additional data associated with the respective input entry. Such additional data may be associated with the baseline entry to generate a more robust and complete data set (e.g., the output data set 110) for use in analyzing the digital content. As described herein, the output data set may be generated at least partially based on user input, such as based on a user selecting and/or confirmed a baseline entry matched to an input entry. In certain embodiments, the output data set may be stored in an output database and used to search for items of digital content and obtain additional information regarding the item of digital content. For example, a user may search the output database for a television series to retrieve an output entry associated with the television series. The output entry may include the additional data associated with the respective input entry, along with other information associated the television series, and the user may review the output entry to analyze and make determinations regarding the television series.

Figure 3:
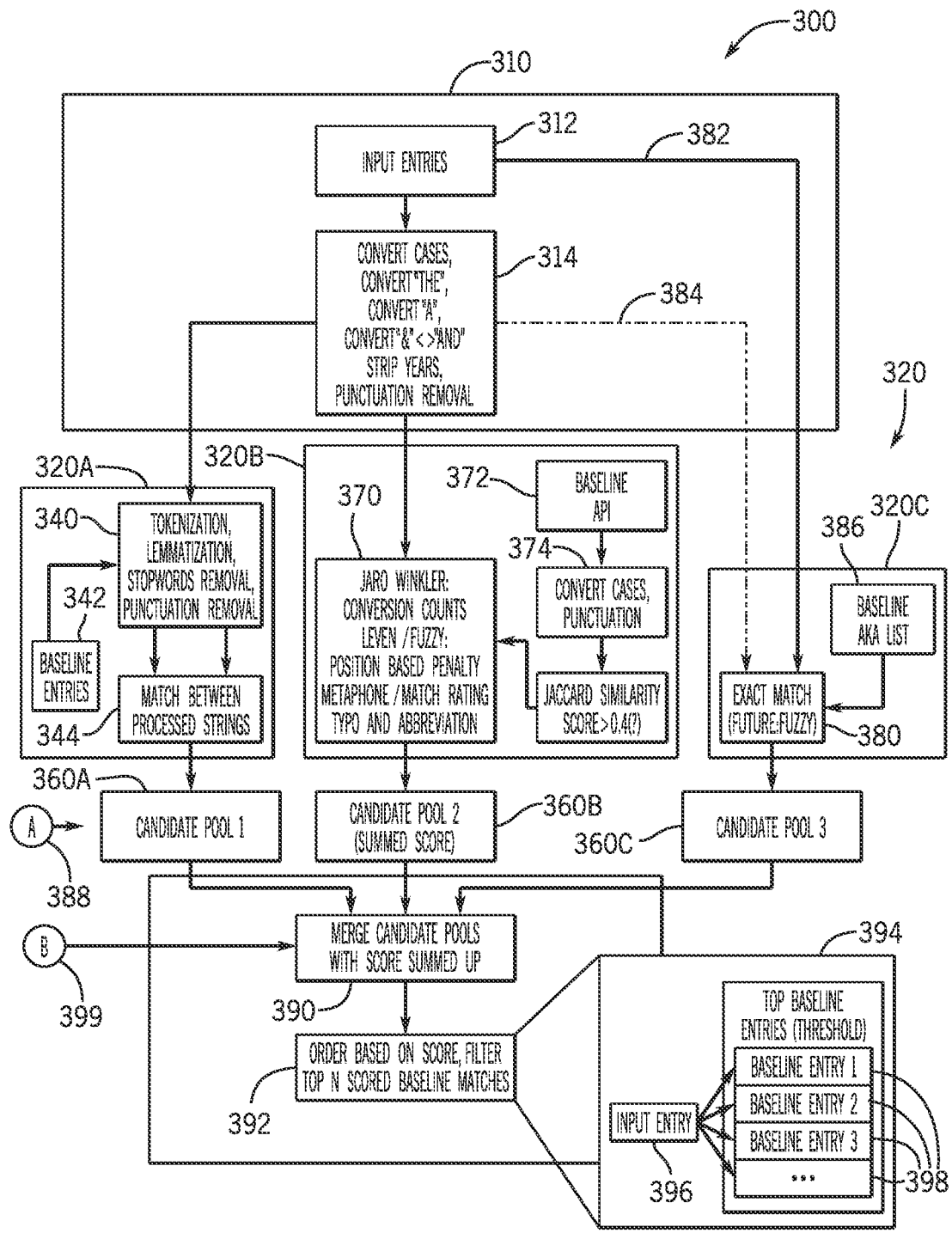
FIG. 3 is a flow diagram depicting an embodiment of a method that may be performed by the matching logic of FIG. 1, in accordance with one or more current embodiments.

FIG. 3 is a flow diagram depicting a method 300 that may be performed by the matching logic 106 of FIG. 1. While the method 300 is described using steps in a specific sequence, it should be understood that the present disclosure contemplates that the described steps may be performed in different sequences than the sequence illustrated, and certain described steps may be skipped or not performed altogether. In some embodiments, the method 300 may be implemented by executing instructions stored in a tangible, non-transitory, computer-readable medium, such as the memory device using the processor.

In block 310, the processor performs preprocessing of input data, such as the input data set received from the input data source 102. In particular, the processor may receive the input data set at block 312, and perform a conversion step at block 314. The conversion step may include removing certain articles (e.g., "a", "an", "the") from each input entry of the input data set, removing "and", removing certain years, converting certain numbers to words, removing certain punctuation, and/or other conversion steps. Determinations regarding which words and/or numbers to remove or convert may depend on a location within the input entry of each respective word or number, among other factors. In some embodiments, block 314 may be omitted.

The processed input entries may be provided to analysis modules 320, where the processor may match each respective input entry (e.g., each respective processed input entry) to one or more baseline entries of the baseline data set. For example, as described below, each analysis module 320 may match, or attempt to match, each respective input entry to one or more baseline entries via natural language processing techniques and/or other matching techniques.

As noted by block 340, analysis module 320A (e.g., a first analysis module) may further process words within each entry (e.g., in addition to the preprocessing described above). Such further processing may include tokenizing one or more words or phrases within some or all input entries (e.g., dividing the words or phrases of the input entry into tokens), lemmatizing one or more words within some or all input entries (e.g., sorting words in the input entry by grouping inflected and/or variant forms of the same words), and/or removing stopwords (e.g., words that do not add sufficient meaning to the input entry, such as "at", "in", "which", "that", and article words). Additionally, baseline entries, such as the baseline entries provided by the baseline data source 104, may be processed through block 340 to tokenize, lemmatize, and/or remove stopwords from the one or more baseline entries, as indicated by block 342. In some embodiments, processing of the baseline entries may include processing similar to that described in reference to block 314. Processing of the baseline entries may facilitate matching the baseline entries to the input entries. For example, processed words of the input entries (e.g., input words) may be matched to processed words of the baseline entries (e.g., baseline words), as indicated by block 344. The matched baseline entries for each input entry may be produced by the analysis module 320A and form a candidate pool 360A (e.g., a first candidate pool) of candidate entries (e.g., first candidate entries). Additionally, each candidate entry in candidate pool 360A may include a matching score indicating how closely the baseline entry matches the respective input entry, such that the matching score is indicative of a degree of matching between the candidate/baseline entry and the input entry.

Analysis module 320B (e.g., a second analysis module) may match, or attempt to match, one or more baseline entries to each input entry via certain natural language processing techniques, such as Jaro-Winkler matching, Levenshtein matching, and/or Metaphone matching, as indicated by block 370. Jaro-Winkler matching may generally refer to matching the baseline entries and the input entries based on relative positions of characters and words within the entries. Levenshtein matching may generally refer to determining an amount of single character edits required to change one word to another, such as to change a word of the input entry to a given baseline entry, or vice versa. Metaphone matching may generally refer to matching words that sound similar but that may be spelled differently. For example, some words of the input words may be misspelled and/or may be abbreviated. Metaphone matching may account for such variations of the words when matching the input entry to the baseline entries. The matched baseline entries for each input entry may be produced by the analysis module 320B and form a candidate pool 360B (e.g., a second candidate pool) of candidate entries (e.g., second candidate entries). Each candidate entry in candidate pool 360B may include a matching score indicating how closely the baseline entry matches the respective input entry.

Additionally, as illustrated in the analysis module 320B by blocks 372 and 374, the baseline entries may be processed prior to comparison and matching with the input entries. For example, in block 372, the baseline entries may be received via a custom application programming interface (API). The custom API may be configured to interface with a database storing the baseline data set, such as the baseline data source 104. In certain embodiments, the custom API may be specific to a particular database and/or a type of the database. At block 374, preprocessing of the baseline entries may be performed, such as preprocessing similar to that described in reference to block 314.

Analysis module 320C (e.g., a third analysis module) may match, or attempt to match, one or more baseline entries to each input entry by exactly matching the baseline entries to the input entry, as indicated by block 380. Only exact matches may be produced via the analysis module 320C to generate the candidate pool 360C (e.g., a third candidate pool) of candidate entries (e.g., third candidate entries). The input entries provided to block 380 may be raw, unprocessed input entries, as indicated by solid line 382, and/or may be preprocessed input entries, as indicated by dashed line 384. Additionally, each candidate entry in candidate pool 360C may include a matching score indicating how closely the baseline entry matches the respective input entry.

In certain embodiments, some or all of the baseline entries provided for comparison in analysis module 320C may be from an also-known-as (AKA) list 386. The AKA list 386 may list alternative forms of the same items of digital content described in the input entries provided from blocks 312 and/or 314. For example, if the input entries identify movie titles, the AKA list 386 may identify movie titles in alternative form(s), such as in an alternative language (e.g., English, Spanish, French). Accordingly, the AKA list 386 may facilitate matching some or all of the input entries to baseline entries.

In some embodiments, the analysis module 320A, 320B, and/or 320C may use machine learning and/or feedback from the data refinement logic 108 to improve the candidate pool 360A, 360B, and/or 360C, respectively, as indicated by input 388. For example, the input 388 may include improved rankings of matched baseline entries based on additional data analyzed via the data refinement logic 108. The analysis performed via the data refinement logic 108 is described in greater detail in relation to FIG. 4.

In block 390, the processor may merge the candidate pools 360A, 360B, and 360C into a merged candidate pool. For example, in block 390, the processor may assign a weight to each candidate pool and may sum or average the respective score for each candidate entry in each candidate pool (e.g., common candidate entries among the candidate pools 360A, 360B, and 360C) to form the merged candidate pool. The merged candidate pool may include each candidate entry with a merged matching score based on the respective scores (e.g., summed, averaged, or otherwise processed/analyzed scores) for that candidate entry in each candidate pool. The weight given to the respective score in each candidate pool may depend on a type of the digital content related to the input entries and baseline entries, among other factors. By way of example, if exact matches of the baseline entries to the input entries are not expected based on the type of digital content, the candidate pool 360C may be assigned less weight relative to the candidate pools 360A and/or 360B due to the analysis modules 320A and/or 320B being more suitable for matching the baseline entries to input entries.

Accordingly, each baseline entry matched to each respective input entry may be assigned a matching score that indicates how closely the baseline entry matches the input entry. The baseline entry may be identified by one or more of the analysis modules 320. For example, multiple analysis modules 320 may identify the same, first baseline entry as matching the input entry, which may result in the first baseline entry (e.g., first candidate entry) having a higher matching score relative to another, second baseline entry (e.g., second candidate entry) identified by only one analysis module 320 (e.g., due to the first baseline entry being in multiple candidate pools 360).

The baseline entries (e.g., candidate entries) for each respective input entry may be ranked according to their respective matching scores, as indicated by block 392. In certain embodiments, the matching score for each baseline entry may be compared to a threshold score, such that only baseline entries (e.g., a subset of the baseline entries) exceeding the threshold score are included in the ranked list and as an output of the method 300 (e.g., the intermediate data set described above). The threshold score may depend on an expected similarity of the input data set and the baseline data set, an amount of baseline entries being matched to the input entries (e.g., a subset of input entries that are initially matched to baseline entries), and other suitable factors. An example of a ranked list of baseline entries exceeding the threshold score is shown in block 394. As illustrated, a single input entry 396 is matched to four potential baseline entries 398, and the four baseline entries 398 are listed in ranked order. The ranked list for each respective input entry may be output by the matching logic 106, as the intermediate data set, as an input for a method 400 described below. In other embodiments, the ranked list may include more or fewer matched baseline entries (e.g., one, two, three, five, six, ten, twenty).

In some embodiments, the ranking of the baseline entries for each input entry may be enhanced/performed via machine learning and/or feedback from the data refinement logic 108, as indicated by input 399. The input 399 may include user input confirming and/or identifying, such as via a user interface described in greater detail in relation to FIGS. 4-8, a particular baseline entry that matches a given input entry. In certain embodiments, the particular baseline entry may be chosen from multiple suggested baseline entries, and in other embodiments, the particular baseline entry may be selected by the user after the user searches for and identifies the particular baseline entry.

While the embodiment described herein includes three analysis modules 320 generating three respective candidate pools 360, other embodiments may include more or fewer analysis modules 320 generating respective candidate pools 360 (e.g., one, two, four, five, six, ten, twenty) for merging. Additionally, the analysis modules 320 may employ alternative natural language processing techniques and/or other matching algorithms to match the baseline entries to the input entries.

In embodiments where the matching logic 106 identifies only a single baseline entry as matching an input entry, the baseline entry may be considered a match to the input entry (e.g., an automatched match). In certain embodiments, as described below, the automatched baseline entry may be presented to the user to enable the user to confirm that the automatched baseline entry is an accurate match to the input entry. After confirmation by the user, the match may be considered a confirmed match. In some embodiments, the matching logic 106 may only automatch the baseline entry to the input entry if a matching score between the baseline entry and the input entry exceeds a threshold value.

Figure 4:
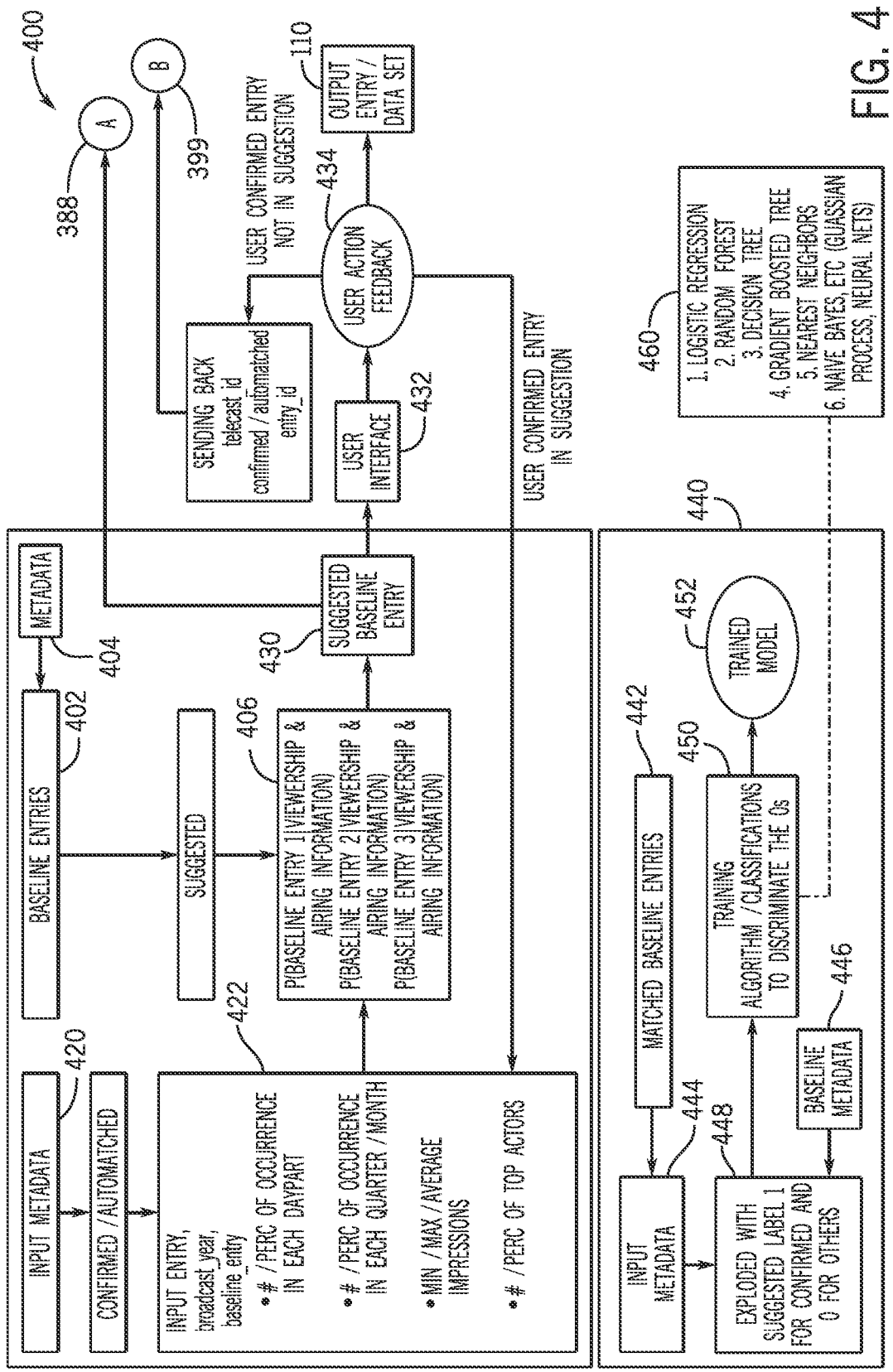
FIG. 4 is a flow diagram depicting an embodiment of a method that may be performed by the data refinement logic of FIG. 1, in accordance with one or more current embodiments.

FIG. 4 is a flow diagram depicting the method 400 that may be performed by the data refinement logic 108 of FIG. 1. While the method 400 is described using steps in a specific sequence, it should be understood that the present disclosure contemplates that the described steps may be performed in different sequences than the sequence illustrated, and certain described steps may be skipped or not performed altogether. In some embodiments, the method 400 may be implemented by executing instructions stored in a tangible, non-transitory, computer-readable medium, such as the memory device using the processor.

As described herein, the data refinement logic 108 may refine the list of likely baseline entries for each respective input entry to determine a matching baseline entry for each input entry (e.g., a baseline entry that most likely matches the input entry). For example, the listing of baseline entries included in block 394 of FIG. 3 may be provided as an input to the method 400 at block 402. Additionally, metadata associated with the baseline data set may be provided as an input at block 404. Metadata associated with the input data set may also be included in the input at block 404. Such metadata may inform which baseline entry in the list of baseline entries is the most accurate match to the input entry. In particular, a probability score may be assigned to each baseline entry, as indicated by block 406, based on the metadata received at block 402 and/or at block 404. In some embodiments, the matching score determined for each baseline entry via the method 300 may be adjusted via the method 400 and based on the metadata received at block 402 and/or at block 406.

The input metadata provided at block 404 may include data source information, genre information, a year of release, a year of production, viewership data, impression data, airing information, and other forms of metadata. The data source information may include information about the input data source 102, such as an entity that operates the input data source 102 and whether the input data set provided by the input data source 102 is actively maintained. Additionally, as described above, the baseline metadata provided at block 404 may also include data source information, genre information, a year of release, a year of production, viewership data, impression data, and other forms of metadata.

By way of example, the input data source 102 may be a database for a network dedicated to providing movies of a particular genre, such as classics, sci-fi, romance, horror, children's entertainment, or another genre. The data refinement logic 108 may review each baseline entry for the respective input entry to determine which baseline entry includes a genre that most closely matches the genre of the input data set. For example, if the genre of the input data source 102 is sci-fi, and one baseline entry is sci-fi while the other baseline entries are romance and children's entertainment, the data refinement logic 108 may assign a higher probability score to the sci-fi baseline entry relative to the other baseline entries.

In certain embodiments, the data refinement logic 108 may review confirmed and/or automatched matches between baseline entries and input entries to improve the probability scoring of other input entries. For example, input metadata associated with the confirmed and/or automatched matches may be received at block 420. The input metadata may be analyzed by the data refinement logic 108 to determine patterns among the confirmed matches and identify additional metadata associated with the input data set and the baseline data set. For example, if a majority of the baseline entries matched to the input entries correspond to a particular genre, the data refinement logic 108 may determine that other input entries in the input data set (e.g., input entries matched to multiple baseline entries) also correspond to the particular genre. Accordingly, these determinations and additional metadata may be provided as an input, as indicated by block 422, into the probability scoring of the multiple baseline entries for each input entry.

The data refinement logic 108 may produce the output data set 110 based on the probability scores identified at block 406. The output data set 110 may include a suggested match of a baseline entry for each input entry that does not already have a confirmed or automatched match, as indicated by block 430. Additionally, as described herein, the output data set 110 may include the confirmed and automatched baseline entries to respective input entries. The data refinement logic 108 may select the suggested baseline entry for each input entry as the baseline entry having the highest probability score. In some embodiments, the data refinement logic 108 may compare the highest probability score to a threshold score and suggest the baseline entry in response to the highest probability score exceeding the threshold score. In response to the highest probability score not exceeding the threshold score, the data refinement logic 108 may provide an indication that no baseline entry has a sufficiently high probability score, such as via a notification of the user interface described herein. As described above, the suggested baseline entry for each input entry may be provide as the input 388 to the analysis modules 320A, 320B, and 320C to improve the candidate pools 360A, 360B, and 360C, generated by the analysis modules 320A, 320B, and 320C.

The suggested baseline entry for each input entry may be displayed to a user via a user interface, as indicated by block 432. Examples of the user interface are described in reference to FIGS. 5-8. The user interface may display the suggested baseline entry for each input entry to enable the user to confirm that the suggested baseline entry should be matched to the baseline entry. Additionally, the user may select an alternative baseline entry (e.g., an alternative to the suggested baseline entry) from the list of baseline entries for an input entry. In certain embodiments, the user interface may display the probability score (and/or the matching score described in reference to FIG. 3) for each baseline entry of the input entry to communicate to the user how closely each baseline entry matches the input entry. Accordingly, the system 100 may receive feedback from the user via the user interface, as indicated by block 434. Based on the user confirming that the suggested baseline entry matches the input entry and/or selecting an alternative baseline entry as matching the input entry, the baseline entry may be output as an output entry and/or part of the output data set 110. In certain embodiments, the baseline entry having the highest probability score may be automatically selected for each input entry and output as the output entry and/or part of the output data set 110 (e.g., independent of the user feedback provided at block 434).

In certain embodiments, the user feedback provided at block 434 may be provided as the input 399 to the matching logic 106 to enhance and/or facilitate the ranking of the baseline entries for each input entry by the matching logic 106. For example, if the user feedback includes identifying a baseline entry that was not suggested by the data refinement logic as matching an input entry, the matching logic 106 may use this feedback to enhance and facilitate future ranking of the baseline entries for each input entry. In particular, the baseline entry identified by the user may include attributes not previously identified as matching potential input entries, such that future input entries having the attributes may be ranked higher relative to previous matching attempts of those input entries or similar input entries. In some embodiments, the user feedback provided at block 434 may be provided to block 422 as confirmed matches of baseline entries to input entries.

Additionally, the data refinement logic 108 may train a machine learning model based on the matched baseline entries and input entries and/or based on the assigned probability scores described above, among other factors, as indicated by block 440. For example, the data refinement logic 108 may access the output data set identifying matched baseline entries to input entries and/or may access the intermediate data set including the matched lists of baseline entries to input entries, as indicated by block 442. Additionally, input metadata (e.g., metadata associated with the input entries of the input data set) may be received, as indicated by block 444, and baseline metadata (e.g., metadata associated with the baseline entries of the baseline data set) may be received, as indicated by block 446. The data refinement logic 108 may assign a "1" to confirmed matches of baseline entries to input entries and assign a "0" to unconfirmed matches and/or lists of baseline entries to an input entry, as indicated by block 448. Alternatively, the data refinement logic may distinguish between the confirmed and unconfirmed matches in other ways. Based on this access and analysis, the data refinement logic 108 may identify patterns, correlations, or trends associated with the data, as indicated by block 450, such as common attributes of certain confirmed matches or unconfirmed matches. Accordingly, the data refinement logic 108 may generate a trained model 452 based on the analysis, and the trained model 452 may facilitate matching baseline entries to input entries. As used herein, machine learning may refer to algorithms and statistical models that computer systems use to perform a specific task with or without using explicit instructions. For example, a machine learning process may generate a mathematical model based on a sample of the output data set, known as "training data," in order to make predictions or decisions without being explicitly programmed to perform the task.

Depending on the inferences to be made, the machine learning of the data refinement logic 108 may implement different forms of machine learning. For example, in some embodiments, supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Examples of matching learning techniques are provided in block 460 (e.g., logistic regression, random forest, decision tree, gradient boosted tree, nearest neighbors, Naive Bayes, and other suitable techniques).

Supervised learning algorithms include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects are. It has applications in ranking, recommendation systems, visual identity tracking, face verification, and speaker verification.

Additionally and/or alternatively, in some situations, it may be beneficial for the machine-learning circuitry to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data.

Cluster analysis is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. Other methods are based on estimated density and graph connectivity.

Figure 5:
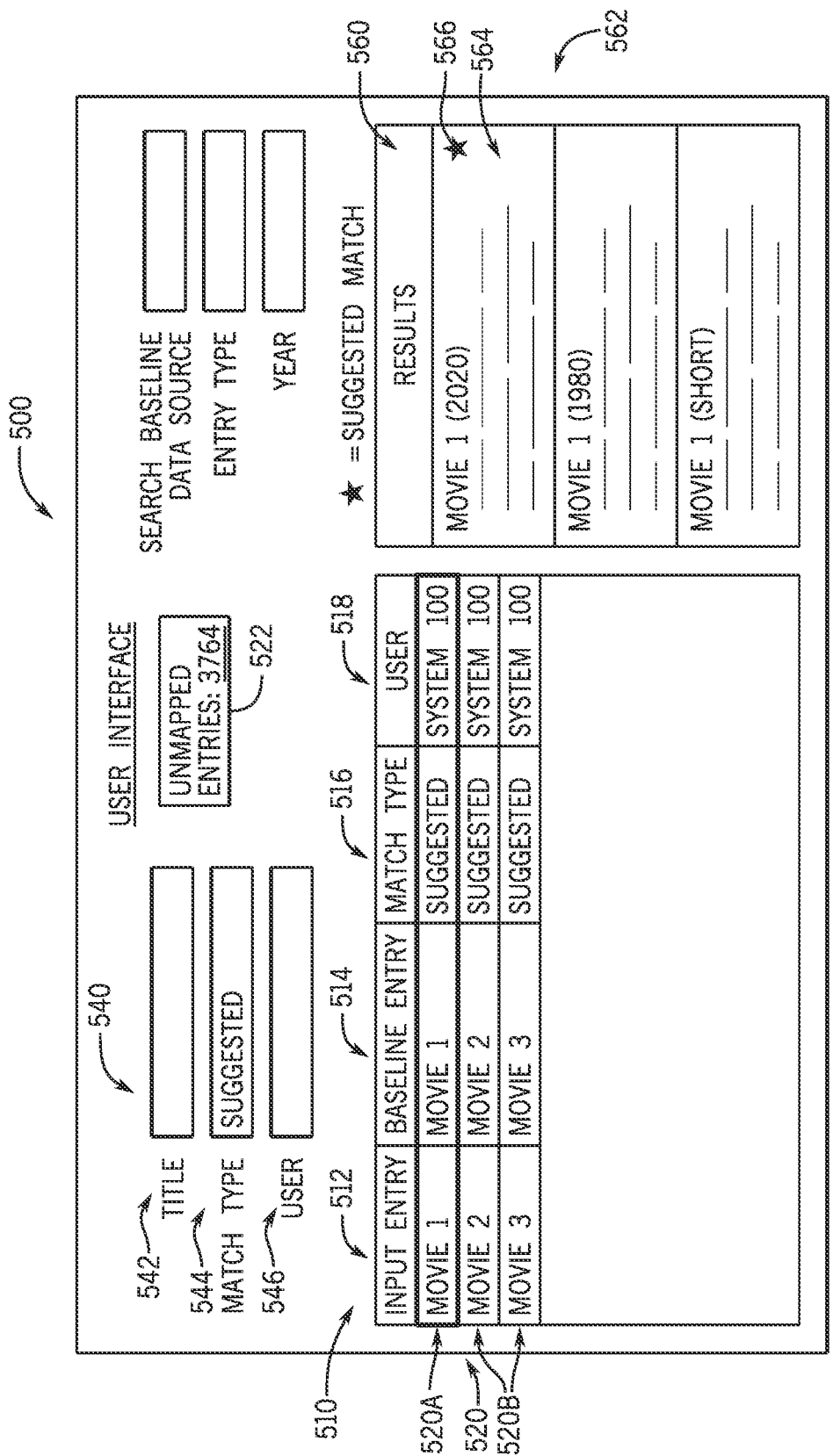
FIGS. 5-8 are block diagrams of embodiments of a graphical user interface of the system of FIG. 1 that may facilitate user interaction with the system of FIG. 1, in accordance with one or more current embodiments.

FIG. 5 is a block diagram of an embodiment of a graphical user interface (GUI) 500 of the system 100 of FIG. 1 that may facilitate user interaction with the system 100. For example, the GUI 500 may enable user interaction with the input data source 102, the baseline data source 104, the matching logic 106, the data refinement logic 108, and/or the output data set 110. The GUI 500 includes a table 510 of input entries 512, baseline entries 514 matched to the input entries 512, match types 516 between the input entries 512 and the baseline entries 514, and users 518 that performed the matching of the input entries 512 and the baseline entries 514. As illustrated, the table 510 includes three entries 520. In other embodiments, the table 510 may include more or fewer entries 520. The GUI 500 also includes a caption 522 identifying a number of unmapped input entries (e.g., a number of input entries that have not been confirmed as matching particular baseline entries).

Additionally, the GUI 500 includes intermediate filters 540, such as a title filter 542, a match type filter 544, and a user filter 546. The intermediate filters 540 may enable the user to filter the entries 520 for entries having particular characteristics, such as a particular title (e.g., via the title filter 542), a particular match type (e.g., via the match type filter 544), and a particular user that performed the matched (e.g., via the user filter 546). As illustrated, the title filter 542 and the user filter 546 are blank. The match type filter 544 includes a match type of SUGGESTED. Accordingly, the entries 520 of the table 510 are filtered to only show entries 520 having the match type of SUGGESTED. Other match types may include CONFIRMED, AUTOMATCH, NONE, and other suitable match types. Titles that may be filtered by the title filter 542 may generally correspond to names of the input entries 512 (e.g., MOVIE 1, MOVIE 2, MOVIE 3, TV SERIES 1, SONG 13, AUDIOBOOK 4). Additionally, users that may be filtered via the user filter 546 may include the system 100, people (e.g., users interacting with the system 100 via the GUI 500), and other suitable users.

The intermediate filters 540 may be free-form fields enabling the user to type keywords and text that filters the entries 520. In certain embodiments, the intermediate filters 540 may be drop-down menus that automatically populate with selectable options for filtering the entries 520. For example, the system 100 may automatically populate the drop-down menus after determining the entries 520 (e.g., the matches between the input entries 512 and the baseline entries 514).

Figure 6:
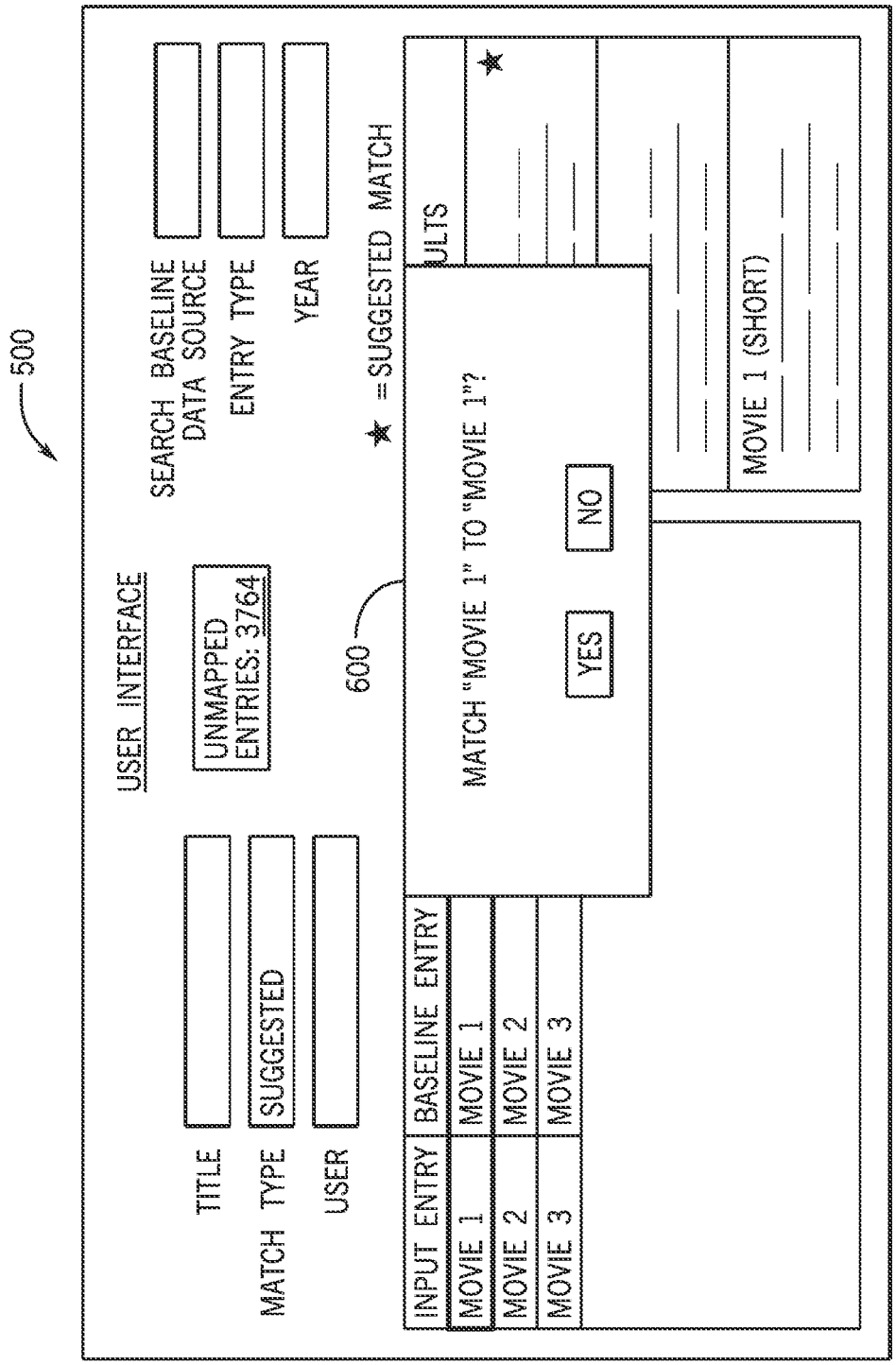

The entries 520 may be selectable to enable the user to select, analyze, and process the entries 520. As illustrated, the entries 520 include a selected entry 520A and unselected entries 520B. In response to the user selecting the selected entry 520A, the system 100 may populate a results list 560 that displays a list of potential matching baseline entries 562 for the input entry of the entry 520A. For example, the results list 560 may display a list of potential baseline entries produced by the matching logic 106 and/or a list of potential baseline entries produced by the data refinement logic 108. In certain embodiments, the results list 560 may include the matching score and/or probability score for each potential baseline entry 562. The system 100 may identify a suggested baseline entry 564 (e.g., the baseline entry listed in the baseline entries 514) via an indicator 566, such as a baseline entry having a highest matching score and/or highest probability score. The indicator 566 is a star in the illustrated embodiment. In other embodiments, the indicator 566 may be other shapes and/or may include a particular color for the suggested baseline entry 564 that distinguishes the suggested baseline entry 564 from other baseline entries of the potential baseline entries 562. Each potential baseline entry 562 of the results list 560 may be selectable to enable the user to select and confirm the potential baseline entry 562 as matching the selected baseline entry 520A. For example, in response to the user selecting the suggested baseline entry 564, the system 100 may identify the suggested baseline entry 564 is a confirmed match to the input entry of the entry 520A and generate and store a record in the output data set 110 of the confirmed match. Additionally, as illustrated in FIG. 6, the system 100 may generate a notification 600 prompting the user to confirm that the suggested baseline entry 564 (e.g., MOVIE 1 (2020)) should be matched to the input entry of the entry 520A (e.g., MOVIE 1).

Figure 7:
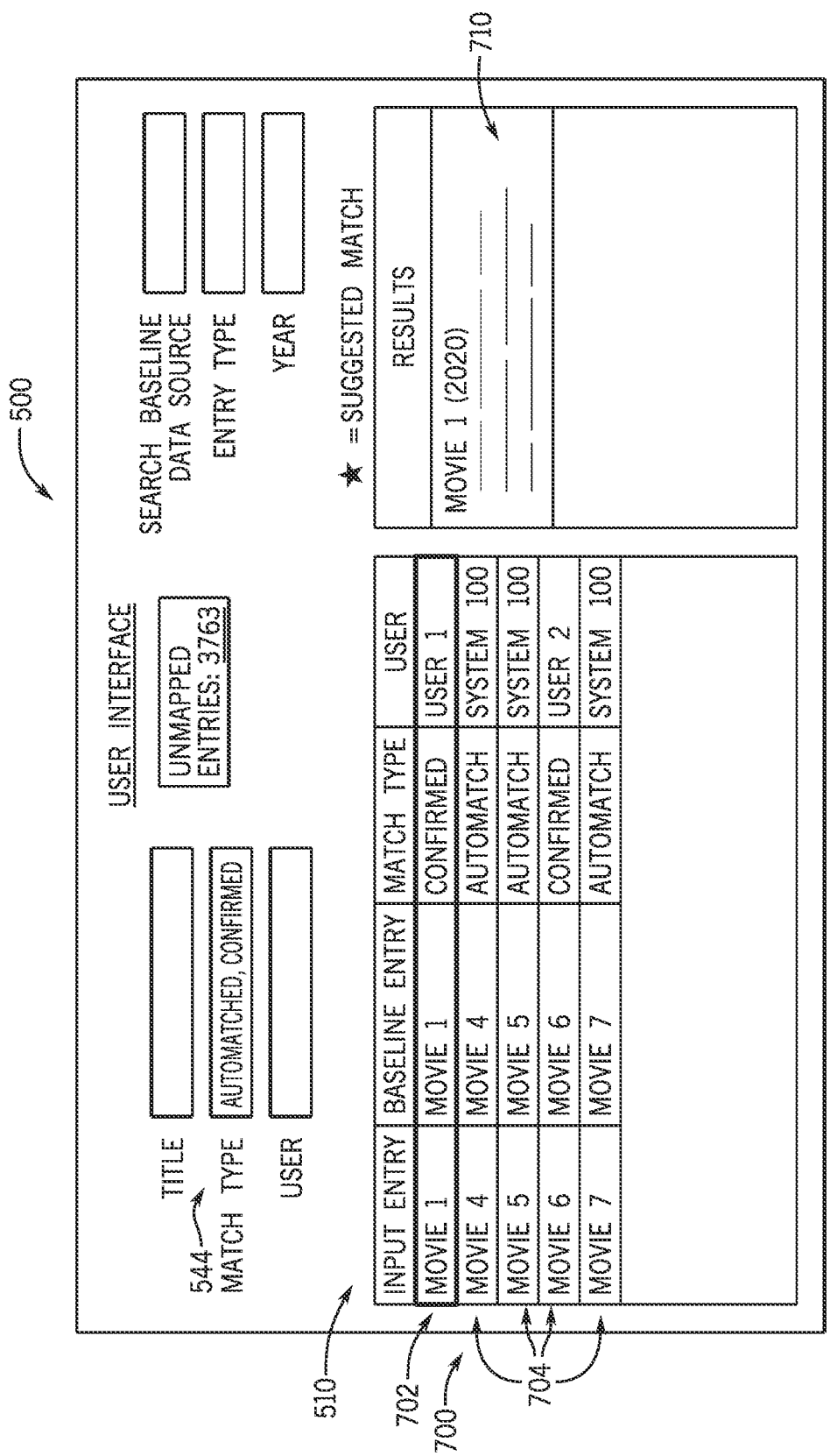

FIG. 7 is an embodiment of the GUI 500 including entries 700 in the table 510 having a match type of CONFIRMED and AUTOMATCH. As illustrated, the match types of CONFIRMED and AUTOMATCH have been entered into the match type filter 544, such that the entries 700 are filtered to only show the entries 700 having the match types of CONFIRMED and AUTOMATCH. The entries 700 include a selected entry 702 and unselected entries 704. The selected entry 702 generally corresponds to the selected entry 520A, and may be an updated/confirmed version of the selected entry 520A. In response to selection of the selected entry 702, the system 100 may display a baseline entry 710 matched to the selected entry 702. The baseline entry 710 may correspond to the suggested baseline entry 564 of FIGS. 5 and 6 that was selected by the user and confirmed as matching the selected entry 702. As illustrated, the caption 522 is updated to show that the number of unmapped entries is one less relative to FIGS. 5 and 6.

Figure 8:
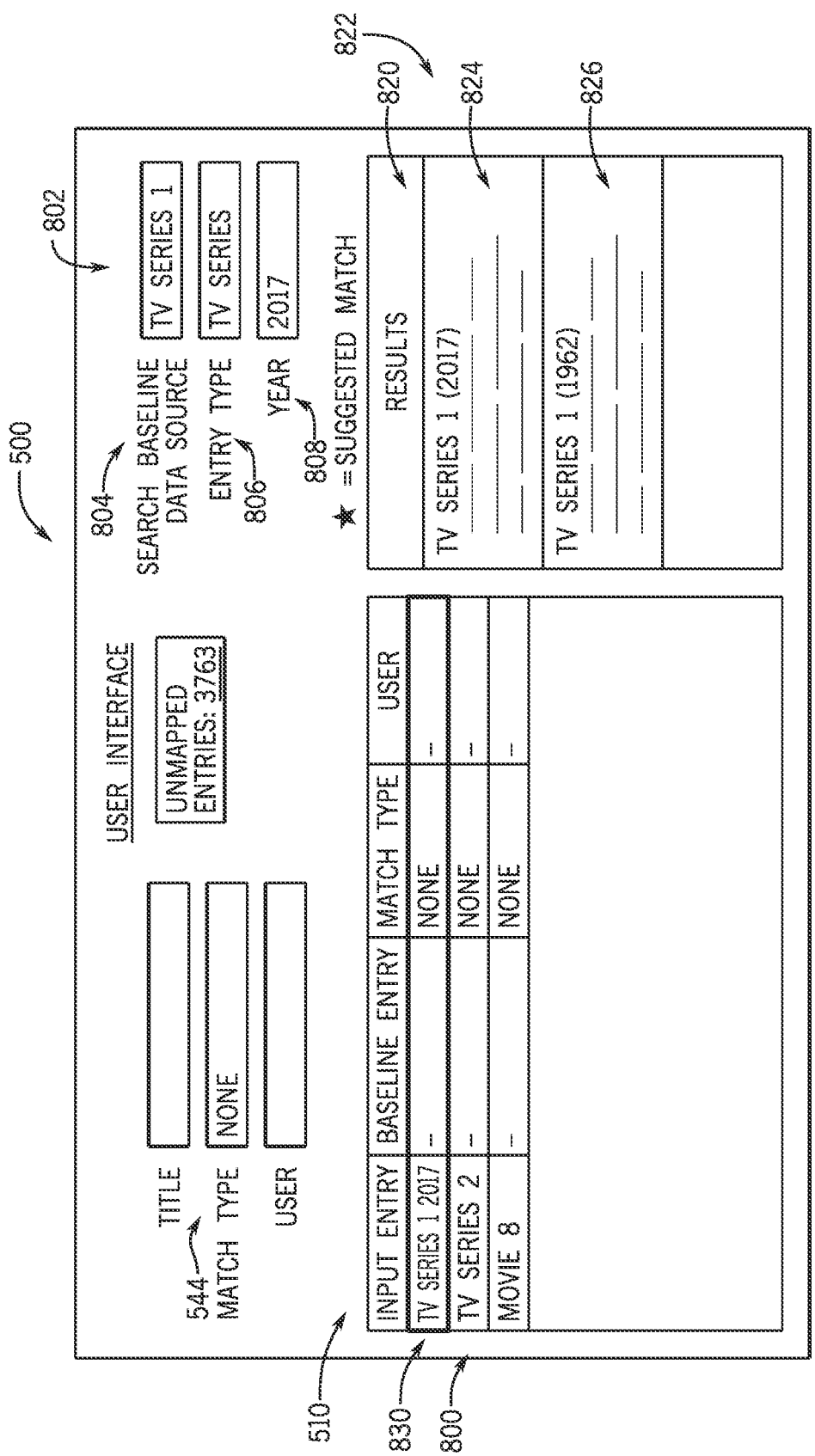

FIG. 8 is an embodiment of the GUI 500 including entries 800 in the table 510 having a match type of NONE, such that the entries 800 include input entries that were not mapped to baseline entries. For example, the system 100 may have determined that no baseline entries sufficiently matched the input entries of the entries 800. As illustrated, the GUI 500 includes baseline filters 802 that enable a user to filter and/or search the baseline data set for baseline entries that may be matched to the input entries of the entries 800. The baseline filters 802 include a search baseline data source field 804, an entry type filter 806, and a year filter 808. The baseline filters 802 may enable the user to filter baseline entries of the baseline data set for baseline entries having particular characteristics, such as a particular name (e.g., via the search baseline data source field 804), a particular entry type (e.g., via the entry type filter 806), and a particular year (e.g., via the year filter 808). Based on inputs provided to the baseline filters 802, the system 100 may search the baseline data set and list baseline entries matching the inputs in the results list 820. As illustrated, the search baseline data source field 804 includes the name TV SERIES 1, the entry type filter 806 includes the entry type TV SERIES, and the year filter 808 includes the year 2017. Accordingly, entries 822 of the results list 820 include a first entry 824 that was produced in 2017 and that matches the name and entry type identified via the inputs and a second entry 826 that matches the name and entry type. The user may review the entries 822 and determine which, if any, is an appropriate match to a selected entry 830 of the entries 800. In the illustrated embodiment, the user may identify that the first entry 824 is an appropriate match and select the first entry 824 as the matching baseline entry. In response, the system 100 may identify the first entry 824 as a confirmed matching baseline entry for the input entry of the selected entry 830.

The baseline filters 802 may be free-form fields enabling the user to type keywords and text that filters and/or searches the baseline data set. In certain embodiments, the baseline filters 802 may be drop-down menus that automatically populate with selectable options for filtering the baseline data set. For example, the system 100 may automatically populate the drop-down menus after receiving and/or processing the baseline data set.

The GUI 500 may be displayed via a computing device that enable user interaction, such as a desktop computer, a laptop, a mobile device (e.g., tablet, a cell phone, a notebook), and other suitable computing devices. In certain embodiments, the system 100 may include the computing device. In some embodiments, the system 100 may generate the GUI 500 and communicate with the computing device, such as to transmit the GUI 500 to the computing device, receive inputs via the GUI 500, and communicate requested information back to the computing device. Additionally, the system 100 may generate and store records (e.g., the output data set 110) based on feedback and user interaction received via the GUI 500.

Accordingly, the system 100 described herein may receive both an input data set and a baseline data set and may generate an output data set via the matching logic 106 and the data refinement logic 108. The output data set may include significantly more information and data relative to the baseline data set alone, such that the output data set may enhance a user's ability to analyze, track, and make determinations regarding digital content associated with the output data set. Additionally, the system 100 may enable user interaction with the input data set, the baseline data set, and the output data set to facilitate accurate review and analysis of such data.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium comprising computer readable instructions, that when executed by one or more processors, causes the one or more processors to perform operations comprising:
   receiving an input data set related to digital content, wherein the input data set comprises a plurality of input entries corresponding to digital content of a digital content service provider, wherein the digital content comprises a provider-specified digital content identifier;
   in response to receiving the input data, match the input data set to a baseline data source having different content identifiers than the provider-specified digital content identifier, by:
      matching each input entry of the plurality of input entries to one or more baseline entries of a baseline data set provided by a baseline data source different than the digital content service provider;
      assigning a probability score to each respective baseline entry of the one or more baseline entries for each respective input entry based on metadata associated with the input data set, wherein the probability score for each respective baseline entry indicates a probability that the respective baseline entry is an accurate match to the input entry;
      filtering out respective baseline entries that do not meet a threshold probability score;
      after the filtering:
         when one respective baseline entry for the respective input entry remains, automatically matching the respective baseline entry to the respective input;
         when more than one respective baseline entry for the respective input entry remains, suggesting a match of a highest probability scored one of the more than one respective baseline entries to the respective input entry; and when no respective baseline entry for the respective input entry remains, identifying no match to the respective input entry;

causing presentation of a graphical user interface that presents results of the matching of the input data set to the baseline data source, the results comprising the automatic matchings, the suggested matchings, and the no matchings; and generating an output data set comprising a plurality of output entries based upon the matching of the input data set to the baseline data source, wherein each respective input entry corresponds to a respective output entry of the plurality of output entries, and wherein each respective output entry with a matching baseline entry is configured to provide enhanced querying associated with the digital content, by providing, to a search engine for searching:

the matching baseline entry of the one or more baseline entries that is matched to the respective input entry; and additional data associated with the respective input entry from the input data set.

2. The non-transitory computer-readable medium of claim 1, wherein matching each input entry of the plurality of input entries to the one or more baseline entries of the baseline data set comprises:

tokenizing, lemmatizing, or both, one or more words of one or more input entries of the plurality of input entries to generate a processed input data set comprising a plurality of processed input entries; and matching each processed input entry of the plurality of processed input entries to the one or more baseline entries of the baseline data set.

3. The non-transitory computer-readable medium of claim 1, wherein matching each input entry of the plurality of input entries to the one or more baseline entries of the baseline data set comprises matching each input entry to the one or more baseline entries via Taro-Winkler matching, Levenshtein matching, Metaphone matching, or a combination thereof.

4. The non-transitory computer-readable medium of claim 1, wherein matching each input entry of the plurality of input entries to the one or more baseline entries of the baseline data set comprises matching one or more input words of each input entry to one or more baseline words of the one or more baseline entries.

5. The non-transitory computer-readable medium of claim 1, wherein matching each input entry of the plurality of input entries to the one or more baseline entries of the baseline data set comprises:

generating a plurality of candidate pools, wherein each candidate pool of the plurality of candidate pools comprise one or more candidate entries for each input entry of the plurality of input entries; and assigning a matching score to each candidate entry of each candidate pool of the plurality of candidate pools, wherein each matching score is indicative of a degree of matching between a respective candidate entry and the respective input entry.

6. The non-transitory computer-readable medium of claim 5, wherein the operations comprise:

merging the plurality of candidate pools by summing or averaging respective matching scores for common candidate entries among the plurality of candidate pools to generate a merged candidate pool, wherein the merged candidate pool comprises a plurality of candidate entries for each input entry of the plurality of input entries, and wherein each candidate entry of the plurality of candidate entries is assigned a merged matching score comprising summed or averaged matching scores; and selecting the one or more baseline entries for each input entry as a subset of candidate entries for each input entry having a merged matching score above a threshold score.

7. The non-transitory computer-readable medium of claim 1, wherein the operations comprise matching each input entry to the one or more baseline entries via a machine learning model, and wherein the machine learning model indicates previous confirmed matches of each respective input entry to the one or more baseline entries.

8. The non-transitory computer-readable medium of claim 1, wherein the input data set comprises movie titles, series titles, episode titles, program titles, event titles, names of people, advertisement information, song names, entity names, or a combination thereof.

9. The non-transitory computer-readable medium of claim 8, wherein the metadata associated with the input data set comprises data source information, genre information, a year of release, a year of production, viewership data, impression data, statistical information associated with an actor, statistical information associated with an athlete, statistical information associated with an entity, or a combination thereof.

10. The non-transitory computer-readable medium of claim 1, wherein the input data set is received from an input data source, wherein the baseline data set is received from a baseline data source, and wherein the input data source is different from the baseline data source.

11. A system, comprising:

one or more hardware processors; and a non-transitory memory storing instructions that, when executed by the one or more hardware processors, causes the one or more hardware processors to perform actions comprising:

receiving an input data set related to digital content, wherein the input data set comprises a plurality of input entries corresponding to digital content of a digital content service provider, wherein the digital content comprises a provider-specified digital content identifier;

in response to receiving the input data, match the input data set to a baseline data source having different content identifiers than the provider-specified digital content identifier, by:

matching one or more input words of each input entry of the plurality of input entries to one or more baseline words of one or more baseline entries of a baseline data set provided by a baseline data source different than the digital content service provider;

assigning a probability score to each respective baseline entry of the one or more baseline entries for each respective input entry based on metadata associated with the input data set, wherein the probability score for each respective baseline entry indicates a probability that the respective baseline entry is an accurate match to the input entry;

filtering out respective baseline entries that do not meet a threshold probability score;

after the filtering:

when one respective baseline entry for the respective input entry remains, automatically matching the respective baseline entry to the respective input;

when more than one respective baseline entry for the respective input entry remains, suggesting a match of a highest probability scored one of the more than one respective baseline entries to the respective input entry; and
when no respective baseline entry for the respective input entry remains, identifying no match to the respective input entry;
causing presentation of a graphical user interface that presents results of the matching of the input data set to the baseline data source, the results comprising the automatic matchings, the suggested matchings, and the no matchings; and
generating an output data set comprising a plurality of output entries based upon the matching of the input data set to the baseline data source, wherein each respective input entry corresponds to a respective output entry of the plurality of output entries, and wherein each respective output entry with a matching baseline entry is configured to provide enhanced querying associated with the digital content, by providing, to a search engine for searching:
the matching baseline entry of the one or more baseline entries that is matched to the respective input entry; and
additional data associated with the respective input entry from the input data set.

12. The system of claim 11, wherein the metadata associated with the baseline data set comprises viewership data associated with each baseline entry of the one or more baseline entries of the baseline data set.

13. The system of claim 12, wherein a first baseline entry of the one or more baseline entries is assigned a higher probability score relative to a second baseline entry of the one or more baseline entries based on the first baseline entry having greater viewership than the second baseline entry.

14. The system of claim 11, wherein the metadata associated with the baseline data set comprises airing information associated with each baseline entry of the one or more baseline entries of the baseline data set, and wherein the airing information comprises a channel, a timeframe, a frequency, or a combination thereof.

15. A method of generating data related to digital content, comprising:
receiving an input data set related to the digital content, wherein the input data set comprises a plurality of input entries corresponding to digital content of a digital content service provider, wherein the digital content comprises a provider-specified digital content identifier;
in response to receiving the input data, match the input data set to a baseline data source having different content identifiers than the provider-specified digital content identifier, by:
matching one or more input words of each input entry of the plurality of input entries to one or more baseline words of one or more baseline entries of a baseline data set provided by a baseline data source different than the digital content service provider;
assigning a probability score to each respective baseline entry of the one or more baseline entries for each respective input entry based on metadata associated with the input data set, wherein the probability score for each respective baseline entry indicates a probability that the respective baseline entry is an accurate match to the input entry;
filtering out respective baseline entries that do not meet a threshold probability score;
after the filtering:
when one respective baseline entry for the respective input entry remains, automatically matching the respective baseline entry to the respective input;
when more than one respective baseline entry for the respective input entry remains, suggesting a match of a highest probability scored one of the more than one respective baseline entries to the respective input entry; and
when no respective baseline entry for the respective input entry remains, identifying no match to the respective input entry;
causing presentation of a graphical user interface that presents results of the matching of the input data set to the baseline data source, the results comprising the automatic matchings, the suggested matchings, and the no matchings; and
generating an output data set comprising a plurality of output entries based upon the matching of the input data set to the baseline data source, wherein each respective input entry corresponds to a respective output entry of the plurality of output entries, and wherein each respective output entry with a matching baseline entry is configured to provide enhanced querying associated with the digital content, by providing, to a search engine for searching:
the matching baseline entry of the one or more baseline entries that is matched to the respective input entry; and
additional data associated with the respective input entry from the input data set.

16. The method of claim 15, wherein matching the one or more input words of each input entry of the plurality of input entries to the one or more baseline words of the one or more baseline entries of the baseline data set comprises matching each input entry to the one or more baseline entries via Jaro-Winkler matching, Levenshtein matching, Metaphone matching, or a combination thereof.

17. The method of claim 15, wherein matching the one or more input words of each input entry of the plurality of input entries to the one or more baseline words of the one or more baseline entries of the baseline data set comprises:
generating a plurality of candidate pools, wherein each candidate pool of the plurality of candidate pools comprise one or more candidate entries for each input entry of the plurality of input entries; and
assigning a matching score to each candidate entry of each candidate pool of the plurality of candidate pools, wherein each matching score is indicative of a degree of matching between a respective candidate entry and the respective input entry.

18. The method of claim 17, comprising:
merging the plurality of candidate pools by summing or averaging respective matching scores for common candidate entries among the plurality of candidate pools to generate a merged candidate pool, wherein the merged candidate pool comprises a plurality of candidate entries for each input entry of the plurality of input entries, and wherein each candidate entry of the plurality of candidate entries is assigned a merged matching score comprising summed or averaged matching scores; and selecting the one or more baseline entries for each input entry as a subset of candidate entries for each input entry having a merged matching score above a threshold score.

* * * * *